(No Model.)
J. H. & T. DODDS.
FERTILIZER DISTRIBUTER.
No. 337,312. Patented Mar. 2, 1886.
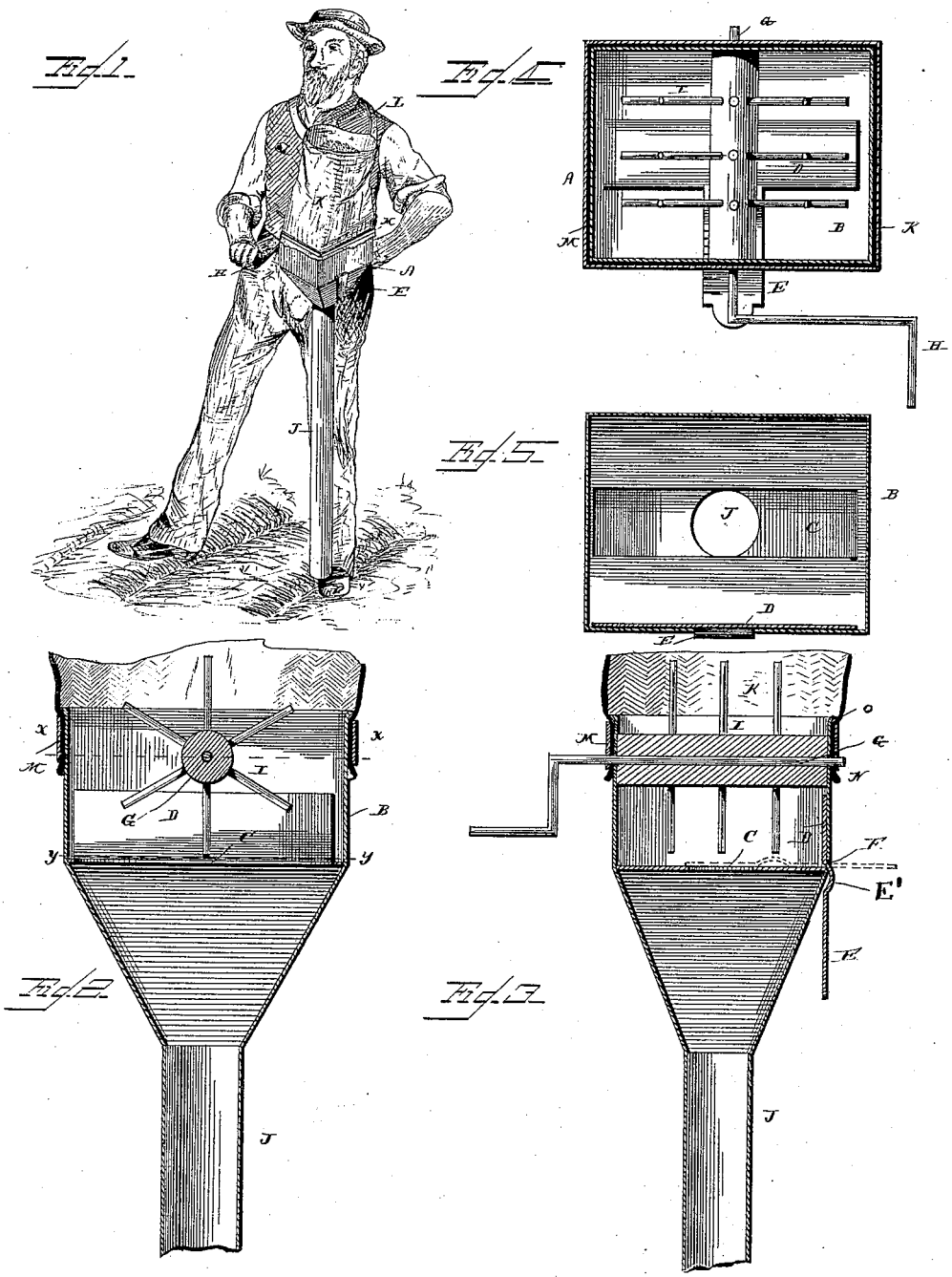
WITNESSES
F. L. Durand
Edward Stanton
INVENTORS.
Joseph H. Dodds,
Thomas Dodds,
By Louis Bagger & Co.
Attorneys.

UNITED STATES PATENT OFFICE.

JOSEPH HUDDLESTON DODDS AND THOMAS DODDS, OF CEDARTOWN, GA.

FERTILIZER-DISTRIBUTER.

SPECIFICATION forming part of Letters Patent No. 337,312, dated March 2, 1886.

Application filed October 17, 1885. Serial No. 180,198. (No model.)

*To all whom it may concern:*

Be it known that we, JOSEPH HUDDLESTON DODDS and THOMAS DODDS, both citizens of the United States, and residents of Cedartown, in the county of Polk and State of Georgia, have invented certain new and useful Improvements in Fertilizer-Distributers; and we do hereby declare that the following is a full, clear, and exact description of the invention, which will enable others skilled in the art to which it appertains to make and use the same, reference being had to the accompanying drawings, which form a part of this specification, and in which—

Figure 1 is a perspective view illustrating the method of using our improved fertilizer-distributer. Fig. 2 is a longitudinal sectional view of the hopper and its attachments. Fig. 3 is a similar view through a plane at right angles to the view shown in Fig. 2. Fig. 4 is a cross-section on line $x\,x$, and Fig. 5 is a cross-section on line $y\,y$.

Similar letters of reference indicate corresponding parts in all the figures.

Our invention has relation to devices for distributing fertilizers in a pulverized form by hand; and it consists in the construction and combination of parts of an improved hand fertilizer-distributer, which will be hereinafter more fully described and claimed.

In the accompanying drawings, A denotes the hopper or receptacle for the fertilizing material, which may be made of wood or metal, and consists of a rectangular box, B, having an aperture, C, in its bottom, which may be closed by means of a slide, D. This slide has an arm, E, which projects through a slot, F, in one side of the box, and the arm E has a scale marked upon its upper side, so that the slide may be graduated in such a manner as to gage the aperture C according to the quantity of fertilizing material which it is desired to feed, or according to the nature of the fertilizing material used. The graduated arm E is also formed near the point where it connects with the slide D with the curved portion E', the object of this construction being that after the arm E has been drawn out in opening the slot C until the curved portion E' reaches the slot F, the slide may be thrown up out of the way, as shown in Fig. 3 of the drawings, so as to leave the opening C perfectly clear, to permit of the utmost quantity of fertilizer being fed down through the tube J.

G is a shaft, which is journaled in the sides of box B, transversely across and about the opening in the bottom. This shaft has a crank or handle, H, for rotating it, and is provided with a pair of fingers or stirrers, as shown at I, which extend down to the gage plate or slide D. The sides of the box converge below the bottom of box B and form the hopper, which feeds the material as it falls through the aperture C down into the chute or tube J, by which it is conducted to the hills on the ground where it is to be deposited.

K is a bag of cloth, or any suitable material, which is provided with a strap, L. The bottom of this bag is open, and is attached to the top of the rectangular box B by means of a band, M, which clamps the lower part of the bag or sack around the top of the box. In order to prevent the bag from slipping, we prefer to construct its lower part with a thick seam, as shown at N, by means of which it will be held firmly upon the box, but yet in such a manner that it may be readily removed by slipping the clamping-band M down over the funnel. We also construct the upper rim of the box B with a bead or flange, O, which will effectually prevent the band M from slipping over the top of the same.

This device is used by putting the strap across the shoulder of the operator, so as to allow the box to be placed a little in front of the left hip. The bag or sack is then filled with the fertilizing material, and the gage-plate is opened so as to feed the approximate number of pounds per acre. This being done, the operator walks across the ground, turning the crank as he goes, when the material will drop through the chute, and be deposited upon the ground at the lower end of the same.

Having thus described our invention, we claim and desire to secure by Letters Patent of the United States—

1. The combination, with the hopper having the longitudinal opening in its bottom and provided with the discharge-tube, arranged as described, of the slide having the graduated arm passing through a slot in the side of the hopper, the said arm being curved, as shown, near the point where it connects with the slide, to adapt it to be adjusted as described, for the purpose set forth.

2. The combination, with the hopper having the longitudinal opening in its bottom and provided with the discharge-tube, arranged as described, of the transverse shaft having the fingers or stirrers, and the slide having the graduated arm passing through a slot in the side of the hopper, the said arm being curved, as shown, near the point where it connects with the slide, to adapt it to be adjusted as described, for the purpose set forth.

In testimony that we claim the foregoing as our own we have hereunto affixed our signatures in presence of two witnesses.

JOSEPH HUDDLESTON DODDS.
THOMAS DODDS.

Witnesses:
L. S. LEDBETTER,
J. O. HARDWICK.